No. 821,266. PATENTED MAY 22, 1906.
T. L. & T. J. STURTEVANT.
LUBRICATOR.
APPLICATION FILED MAR. 6, 1905.

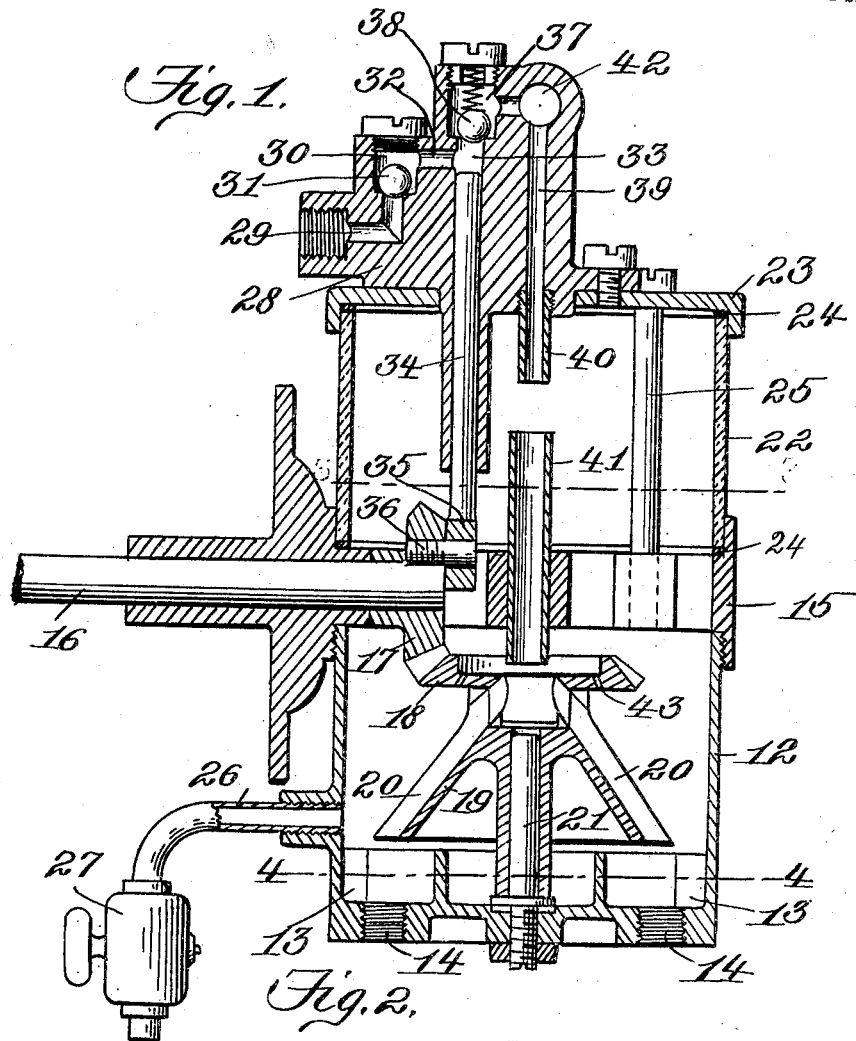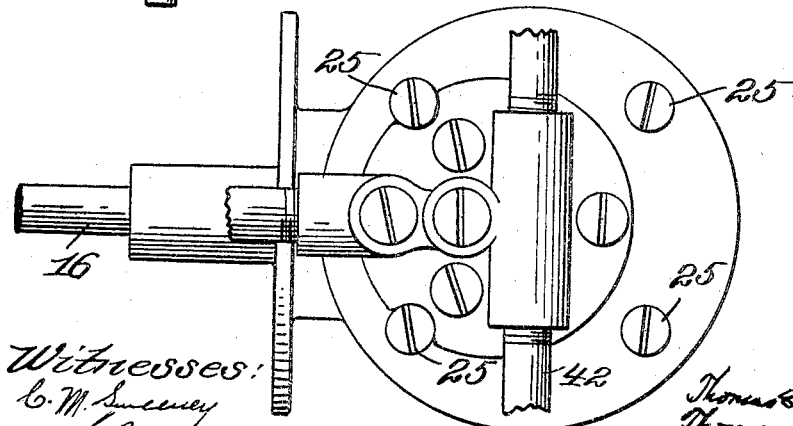

2 SHEETS—SHEET 2.

Witnesses:
C. M. Sweeney
A. Cushman

Inventors:
Thomas L. Sturtevant
Thomas J. Sturtevant

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, OF PORTLAND, MAINE, A CORPORATION OF MAINE.

LUBRICATOR.

No. 821,266.     Specification of Letters Patent.     Patented May 22, 1906.

Application filed March 6, 1905. Serial No. 248,456.

*To all whom it may concern:*

Be it known that we, THOMAS LEGGETT STURTEVANT, residing at Quincy, and THOMAS JOSEPH STURTEVANT, residing at Wellesley, in the county of Norfolk and State of Massachusetts, citizens of the United States, have invented or discovered certain new and useful Improvements in Lubricators, of which the following is a specification, reference being had therein to the accompanying drawings.

This invention relates to that class of lubricators or oiling devices provided with a plurality of outlets which are to be connected with the several parts of a machine or engine to be lubricated; and the invention has for its object to provide a lubricator of the class referred to by means of which the oil which is fed or admitted to the lubricator may be evenly distributed to the several outlets, so that there will be an unfailing supply of the lubricant to all of the various parts of the machine or engine connected with said outlets.

To this end the invention comprises a revolving or otherwise moving distributer which receives the incoming lubricant and distributes the same to the several outlets of the lubricator, as will hereinafter more fully appear.

Figure 3:
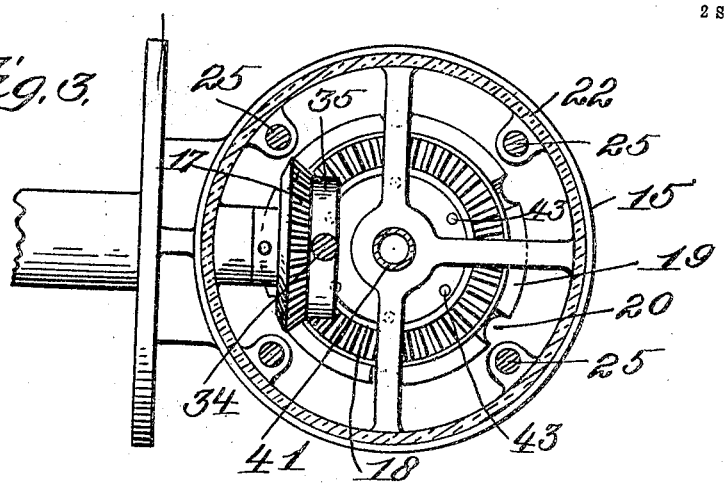
Figure 4:
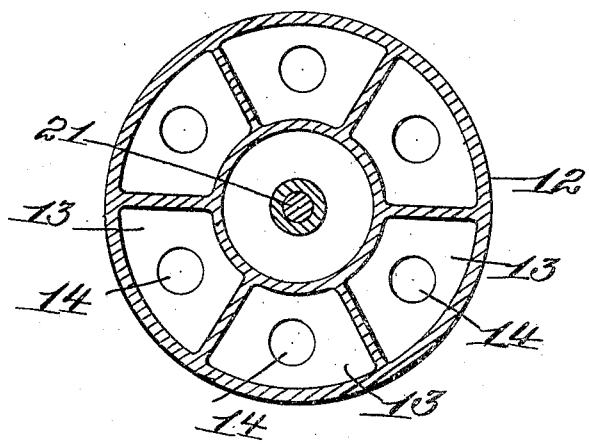
Figure 5:
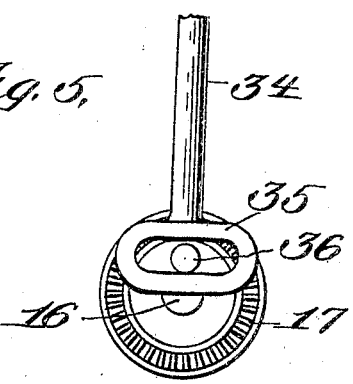

In the accompanying drawings, Figure 1 is a vertical section of a lubricator embodying the present invention, and Fig. 2 is a top or plan view thereof. Fig. 3 is a section of the same on line 3 3, Fig. 1; and Fig. 4 a section on line 4 4, Fig. 1. Fig. 5 is a detail view to show the crank connection of the pump cross-head.

Referring to the drawings, 12 denotes the base or cup portion of the lubricator, the same being provided with a circular series of pockets 13, each of which has an outlet 14, which in practice will be connected by a suitable pipe or tube with a part of the machine or engine to be lubricated. The cup 12 has in the construction herein shown a screw-threaded connection with a metal frame-piece 15, which affords a bearing for a driving-shaft 16, provided with a beveled gear 17, which drives the rotary distributer and the pump.

In the form of the invention herein illustrated the rotary distributer comprises a bevel-gear 18, meshing with the bevel-gear 17, and rigid or integral with the said bevel-gear 18 is a conical distributer proper, 19, which is preferably provided with a series of grooves 20, discharging into the pockets 13 of the cup 12. The rotary distributer 19 is journaled on a stud 21, fixed to the base of the cup 12.

The lubricator will preferably comprise an air-tight chamber communicating with a suitable compressed-air supply or with a supply of gases under pressure taken from the cylinder of a gas-engine or otherwise, and to this end the upper portion of the chamber will preferably consist of a glass cylinder 22, interposed between the frame-piece 15 and the top plate 23, packing-rings 24 at the top and bottom of the said glass cylinder being preferably provided to make air-tight joints. The said top plate 23 is connected with the frame-piece 15 by screw-bolts 25, herein shown as being tapped in lugs or parts of said part 15. Air under pressure may be admitted to the chamber of the lubricator for the purpose of forcing out the oil through a pipe or tube 26, opening into said chamber and provided with a cock 27, which may be turned to close the said air pipe or tube when desired.

The oil-inlet portion of the lubricator in the construction herein shown comprises a block 28, mounted on the top plate 23 and provided with an oil-inlet 29, communicating with a chamber 30, in which is located a ball-valve 31. The chamber 30 communicates by a passage 32 with a pump-cylinder chamber 33, in which works a piston 34, provided with a cross-head 35, receiving a crank-pin 36 on the bevel gear-wheel 17. The pump-cylinder communicates with a chamber 37, provided with a ball-valve 38, said chamber 37 in turn communicating with a feed-passage 39, preferably terminating within the chamber of the lubricator in a tube 40, arranged above, but separated from, a feed-tube 41 to afford a sight-feed, the said tube 41 discharging into the distributer. The pump just described will force the incoming oil into the chamber of the lubricator against the air or other fluid-pressure therein if there be such pressure within the said chamber; but said pump need not necessarily be employed if the oil be fed to the lubricator simply by gravity from an oil-tank placed above said lubricator or on a higher level than the same. In such case oil may be admitted to the chamber of the lubricator through an inlet 42 near the top of the block 28.

In the construction herein shown the bevel-gear 18 is recessed at its top to afford a small oil-receiving cup, from which through ducts 43 the oil can pass to the distributing-cone 19 below, and although this is the preferred form of the invention the latter is not to be understood as being limited thereto, as the oil might be distributed directly from the cupped bevel-gear 18 into the pockets 13, or the rotary distributer might consist of a flat plate or table onto which the oil might be fed and from which the oil might be discharged by centrifugal action against the inner wall of the cup 12, so as to run down into the receiving-pockets 13. It will also be understood that if the oil be fed to the chamber of the lubricator by gravity through the inlet 42 and no fluid-pressure be employed within the chamber the force-feed pump might be omitted altogether, and the details of the invention may be otherwise varied without departing from the spirit of the invention. The single force-pump serves in coöperation with the fluid-pressure within the chamber of the lubricator to force the lubricant through the several outlets, while the sight-feed always shows whether or not the pump be properly working, and if at any time it should not be properly working the air or gas pressure can be shut off by the cock 27 and oil be admitted by gravity through the inlet 42.

Having thus described our invention, we claim and desire to secure by Letters Patent—

1. In a lubricator, the combination with an inclosed chamber provided with a suitable inlet and with a series of oil receptacles or pockets each of which has an outlet, of a movable automatic distributer located within said chamber and overhanging said pockets, operating means, also within said chamber, for said distributer, and means for feeding oil to the outer surface of said distributer.

2. In a lubricating device, the combination with a chamber provided with a plurality of outlets and with a suitable inlet, of a downwardly-flaring conical rotary distributer within said chamber, and automatic means within said chamber for feeding oil to the outer surface of said distributer.

3. In a lubricating device, the combination with an inclosed chamber provided with a suitable inlet and with a series of oil receptacles or pockets each of which has an outlet, of a rotary distributer located within said chamber and overhanging said pockets, and a sight-feed delivering device, also within said chamber, for supplying oil to said distributer.

4. In a lubricating device, the combination with an inclosed chamber provided with a plurality of outlets and with a suitable inlet, of a rotary distributer located above said pockets within said chamber, and a sight-feed delivering device, also within said chamber, for supplying oil to said distributer.

5. In a lubricating device comprising an inclosed chamber provided with a plurality of outlets and a lubricant-inlet, of a rotary distributer within said chamber for distributing the liquid lubricant to the several outlets, force-feeding means, also within said chamber, for supplying the lubricant to said distributer, and a valved inlet to said chamber for enabling a lubricating fluid to be admitted to said chamber against internal pressure.

6. In a lubricating device comprising an inclosed chamber provided with a plurality of outlets and a lubricant-inlet, of a conical, grooved, rotary distributer within said chamber for distributing the liquid lubricant to the several outlets, means for supplying the lubricant to said distributer, and an inlet to said chamber by which fluid under pressure may be admitted thereto.

7. In a lubricating device, the combination with an inclosed chamber provided with a plurality of outlets and with a lubricant-inlet, of a force-pump within said chamber for feeding the lubricant to the said inlet, operating means for said force-pump, also within said chamber, and an oil-dividing mechanism, also within said chamber, for distributing the lubricant to the several outlets.

8. In a lubricating device, the combination with an inclosed chamber provided with a plurality of outlets and with a lubricant-inlet, of a force-pump within said chamber for feeding the lubricant to the said inlet, operating means for said force-pump, also within said chamber, and a movable distributer, also within said chamber, for delivering the lubricant to the said outlets.

9. In a lubricating device, the combination with an inclosed chamber provided with a plurality of outlets and with a lubricant-inlet, of a force-pump within said chamber for feeding the lubricant to the said inlet, a movable distributer, also within said chamber, for delivering the lubricant to the said outlets, and a sight-feed delivery device, also within said chamber, for supplying a liquid lubricant to said distributer.

10. In a lubricating device, the combination with an inclosed chamber provided with a plurality of outlets and with a lubricant-inlet, of a single force-pump for forcing the lubricant into said chamber, a downwardly-flaring, conical, rotary distributer for delivering the lubricant to the said outlets, and means for delivering from said force-pump to the outer surface of said distributer.

11. In a lubricating device, the combination with an inclosed chamber provided with a plurality of outlets and with a lubricant-inlet, of a single force-pump for forcing the lubricant into said chamber, a conical rotary distributer for delivering the lubricant to the said outlets, and a sight-feed delivery device for supplying a liquid lubricant to said distributer.

12. In a lubricator, the combination with an air-tight chamber provided with a suitable inlet and with a plurality of outlets, of a movable distributer within said chamber for delivering oil to said outlets, automatic means for operating said distributer, and means for admitting a pressure fluid to said chamber for forcing out the oil at said outlets.

13. In a lubricator, the combination with an air-tight chamber provided with a valved inlet and with a plurality of outlets, of a movable distributer within said chamber for delivering oil to said outlets, automatic means for operating said distributer, and means for admitting a pressure fluid to said chamber for forcing out the oil at said outlets.

14. In a lubricator, the combination with an air-tight chamber provided with a suitable inlet and with a plurality of oil receptacles or pockets each of which has an outlet, of a movable distributer within said chamber for delivering oil to the said receptacles or pockets, automatic means for operating said distributer, and means for admitting a pressure fluid to said chamber for forcing out the oil at said outlets.

15. In a lubricator, the combination with an air-tight chamber provided with a suitable inlet and with a plurality of oil receptacles or pockets each of which has an outlet, of a movable distributer within said chamber for delivering oil to the said receptacles or pockets, automatic means, also within said chamber, for operating said distributer, and means for admitting a pressure fluid to said chamber for forcing out the oil at said outlets.

16. In a lubricator, the combination with an air-tight chamber provided with a valved inlet and with a plurality of oil receptacles or pockets each of which has an outlet, of a movable distributer within said chamber for delivering oil to the said receptacles or pockets, automatic means for operating said distributer, and means for admitting a pressure fluid to said chamber for forcing out the oil at said outlets.

17. In a lubricator, the combination with an air-tight chamber provided with a valved inlet, and with a plurality of oil receptacles or pockets each of which has an outlet, of a movable distributer within said chamber for delivering oil to the said receptacles or pockets, automatic means, also within said chamber, for operating said distributer, and means for admitting a pressure fluid to said chamber for forcing out the oil at said outlets.

18. In a lubricator, the combination with an inclosed chamber having a suitable inlet and a plurality of oil receptacles or pockets, of a horizontally-rotating distributer located within said chamber and overhanging said receptacles or pockets, and means, also located within said chamber, for feeding oil to said distributer.

19. In a lubricator, the combination with an inclosed chamber having a valved inlet and a plurality of oil receptacles or pockets, of a horizontally-rotating distributer located within said chamber and overhanging said receptacles or pockets, and means, also located within said chamber, for feeding oil to said inlet and thence to said distributer.

In testimony whereof we affix our signatures in presence of two witnesses.

THOMAS LEGGETT STURTEVANT.
THOMAS JOSEPH STURTEVANT.

Witnesses:
W. H. ELLIS,
E. M. HILTON.